(12) United States Patent  (10) Patent No.: US 8,151,945 B2
Tsai  (45) Date of Patent: Apr. 10, 2012

(54) BICYCLE BRAKE WITH A MECHANISM FOR QUICKLY LOOSENING BRAKE CABLE

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 163 days.

(21) Appl. No.: 12/786,448

(22) Filed: May 25, 2010

(65) Prior Publication Data

US 2011/0290594 A1    Dec. 1, 2011

(51) Int. Cl.
 *B62L 1/06* (2006.01)
(52) U.S. Cl. .................. 188/24.19; 188/24.22
(58) Field of Classification Search .............. 188/24.11, 188/24.12, 24.19, 24.21, 24.22, 2 D; 74/500.5, 74/502.6; 254/243, 251
See application file for complete search history.

(56) References Cited

U.S. PATENT DOCUMENTS 5,425,434 A * 6/1995 Romano ................ 188/24.19

* cited by examiner

*Primary Examiner* — Robert A Siconolfi
*Assistant Examiner* — Vu Q Nguyen

(57) ABSTRACT

A brake apparatus for a bicycle includes a finger member; a first am comprising a cable adjuster with a brake cable securely passing through, and a first brake pad; a first pivot for pivotably securing the first arm and one end of the finger member to a frame of the bicycle; a pivot member pivotably secured to the other end of the finger member and comprising a second brake pad and a bifurcation; a second arm having an extension proximate to one end and the other end secured to one end of the brake cable; a second pivot for pivotably securing the bifurcation and one end of the second arm and together; a spring depressible cam lever pivotably mounted in the bifurcation, the cam lever being pressed by the extending end of the second arm and comprising an actuation projection; and a fastener adjacent the cam lever.

1 Claim, 4 Drawing Sheets

BICYCLE BRAKE WITH A MECHANISM FOR QUICKLY LOOSENING BRAKE CABLE

BACKGROUND OF THE INVENTION

1. Field of Invention

The invention relates to bicycle brake systems and more particularly to a bicycle brake having a cam lever mechanism for quickly loosening a brake cable without using tools so that a subsequent wheel replacement can be facilitated.

2. Description of Related Art

Typically, brake performance is the most important factor in designing a bicycle brake. A brake cable which can be quickly loosened for facilitating a subsequent wheel change is also under consideration. A typical bicycle brake comprises two opposite brake pads at both ends of a caliper brake respectively. Driver may press the brake lever on the handlebar to move the brake pads toward each other to clamp the wheel rim until it is slowed or stopped.

It is understood that a distance between wheel rim and either brake pad is small. Also, cross-section of tire has a diameter greater than width of the wheel rim. Hence, for replacing a worn or broken wheel a person has to first loosen the brake cable to increase distance between two brake pads. Thereafter, the person can change wheel. However, this is time consuming. Thus, the need for improvement exists.

SUMMARY OF THE INVENTION

It is therefore one object of the invention to provide a brake apparatus for a bicycle, the brake apparatus comprising a finger member; a first am comprising a cable adjuster with a brake cable securely passing through, a first brake pad attachment member, a first brake pad mount fastened at the first brake pad attachment member, and a first brake pad fastened at the first brake pad mount; first means for pivotably securing the first arm and one end of the finger member to a frame of the bicycle; a pivot member pivotably secured to the other end of the finger member and comprising a second brake pad attachment member, a second brake pad mount fastened at the second brake pad attachment member, a second brake pad fastened at the second brake pad mount, and a bifurcation distal the second brake pad attachment member; a second arm having an extension proximate to one end and the other end secured to one end of the brake cable; second means for pivotably securing the bifurcation and one end of the second arm and together; a spring depressible cam lever pivotably mounted in the bifurcation, the cam lever being pressed by the extending end of the second arm and comprising an actuation projection; and a fastener disposed in the bifurcation and being adjacent to the cam lever, whereby clockwise depressing the actuation projection to clockwise pivot the extension of the second arm until the extension of the second arm is clamped by and between the cam lever and the fastener will loosen the brake cable and increase a distance between the first brake pad and the second brake pad.

The above and other objects, features and advantages of the invention will become apparent from the following detailed description taken with the accompanying drawings.

DETAILED DESCRIPTION OF THE INVENTION

Figure 1:
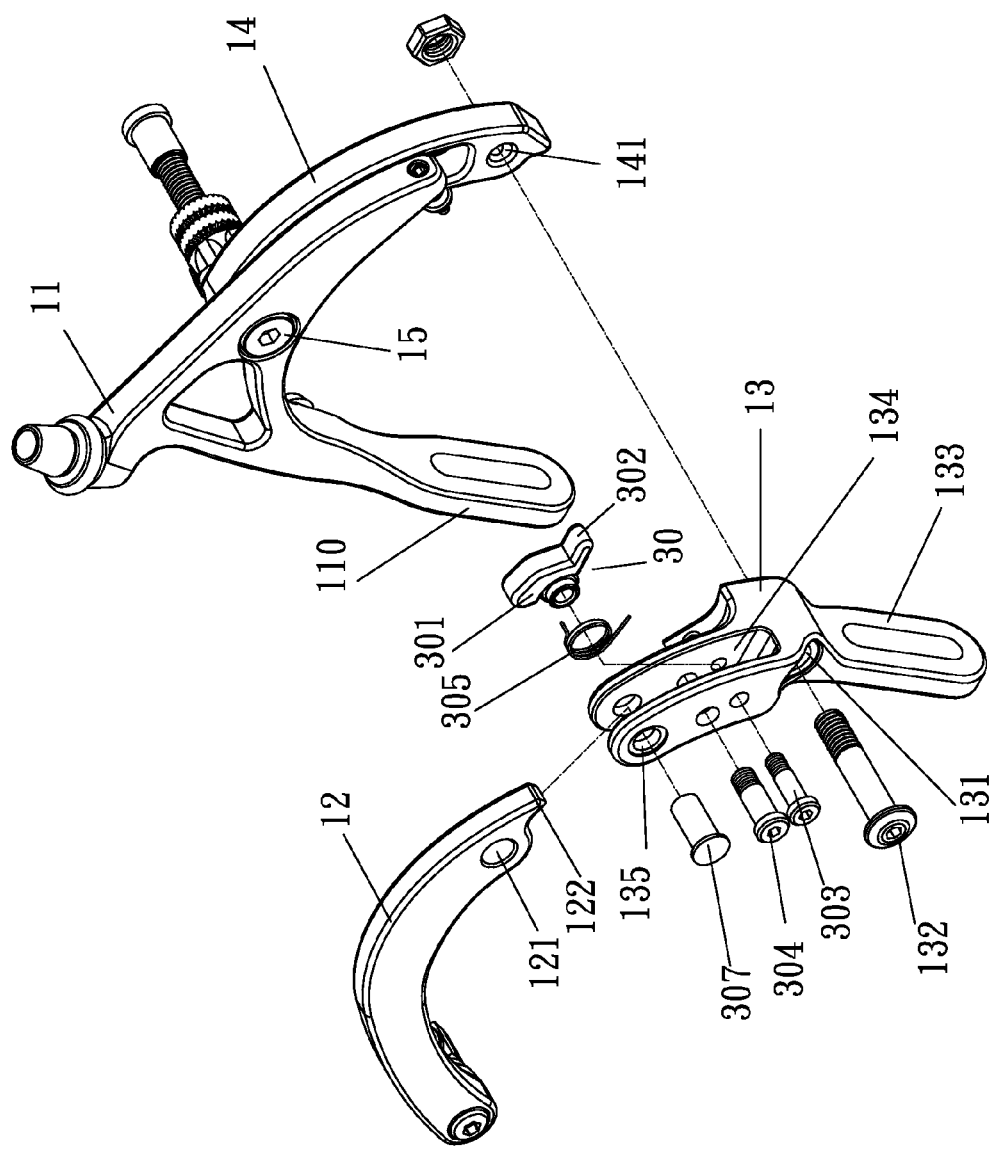
FIG. 1 is an exploded view of a bicycle brake device incorporating a cam lever mechanism for quickly loosening a brake cable according to the invention.
Figure 2:
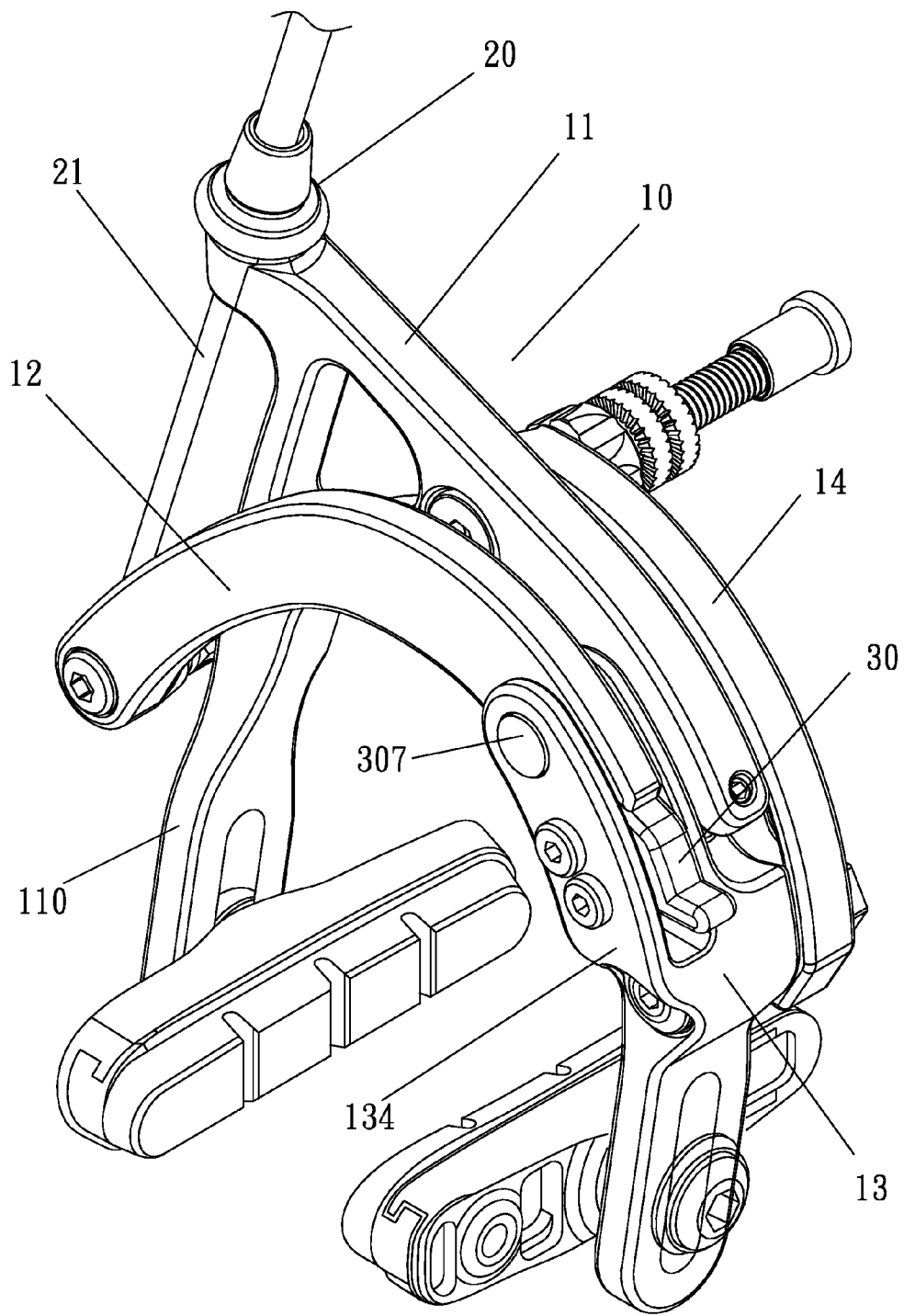
FIG. 2 is a perspective view of the brake device which is a dual-pivot side-pull caliper brake.

Referring to FIGS. 1 to 4, a bicycle brake device 10 in accordance with the invention is shown. The brake device 10 is implemented as a dual-pivot side-pull caliper brake and comprises the following components as discussed in detail below.

A first arm 11 comprises a first brake pad attachment portion 110 at a lower end. A finger portion 14 is pivotably secured to the first arm 11 by means of a bolt 15. A through hole 141 at an end of the finger portion 14 distal the bolt 15.

A curved second arm 12 comprises a through hole 121 proximate to an extending sharp end 122. An elongated pivot member 13 comprises a second brake pad attachment portion 133 at a lower end, an intermediate hole 131, a bifurcation 134 extending upward from the hole 131, two opposite holes 135 at an open end of the bifurcation 134, and a bolt 132 driven through the hole 131 and the through hole 141 to threadedly secure to a nut (not numbered) to pivotably secure the pivot member 13 and the finger portion 14 together.

A cam lever 30 comprises an urging portion 301 engaging the sharp end 122 from below in an inoperative position, and a projection 302 opposite the urging portion 301. A pivot 307 is driven through the holes 135 and the through hole 121 to pivotably secure the second arm 12 to the bifurcation 134 (i.e., the cam lever 30). A fastener 303 is driven through two opposite first through holes (not numbered) of the bifurcation 134 and a torsion spring 305 tightly put on a short cylindrical portion of the cam lever 30 into the cylindrical portion of the cam lever 30. Another fastener 304 is driven through two opposite second through holes (not numbered) of the bifurcation 134 to urge against the urging portion 301. As a result, one end of the spring 305 is urged against the bottom of the bifurcation 134 and the other end thereof is urged against the urging portion 301 from below. The spring 305 makes contact with the fastener 304. The cam lever 30 is thus implemented as a spring depressible member.

Two brake pad mounts 41 are secured to the first brake pad attachment portion 110 and the second brake pad attachment portion 133 respectively. A brake pad 42 is provided on each brake pad mount 41 facing rim 51 of a wheel (e.g., front wheel or rear wheel) 50.

A cable adjuster 20 is provided in one of three ends of the first arm 11. A brake cable 21 has one end connected to a brake lever (not shown) provided on a handlebar (not shown) and the other end connected to the other end (i.e., distal the sharp end 122) of the second arm 12 after passing the cable adjuster 20 and being fastened by the cable adjuster 20.

Figure 3:
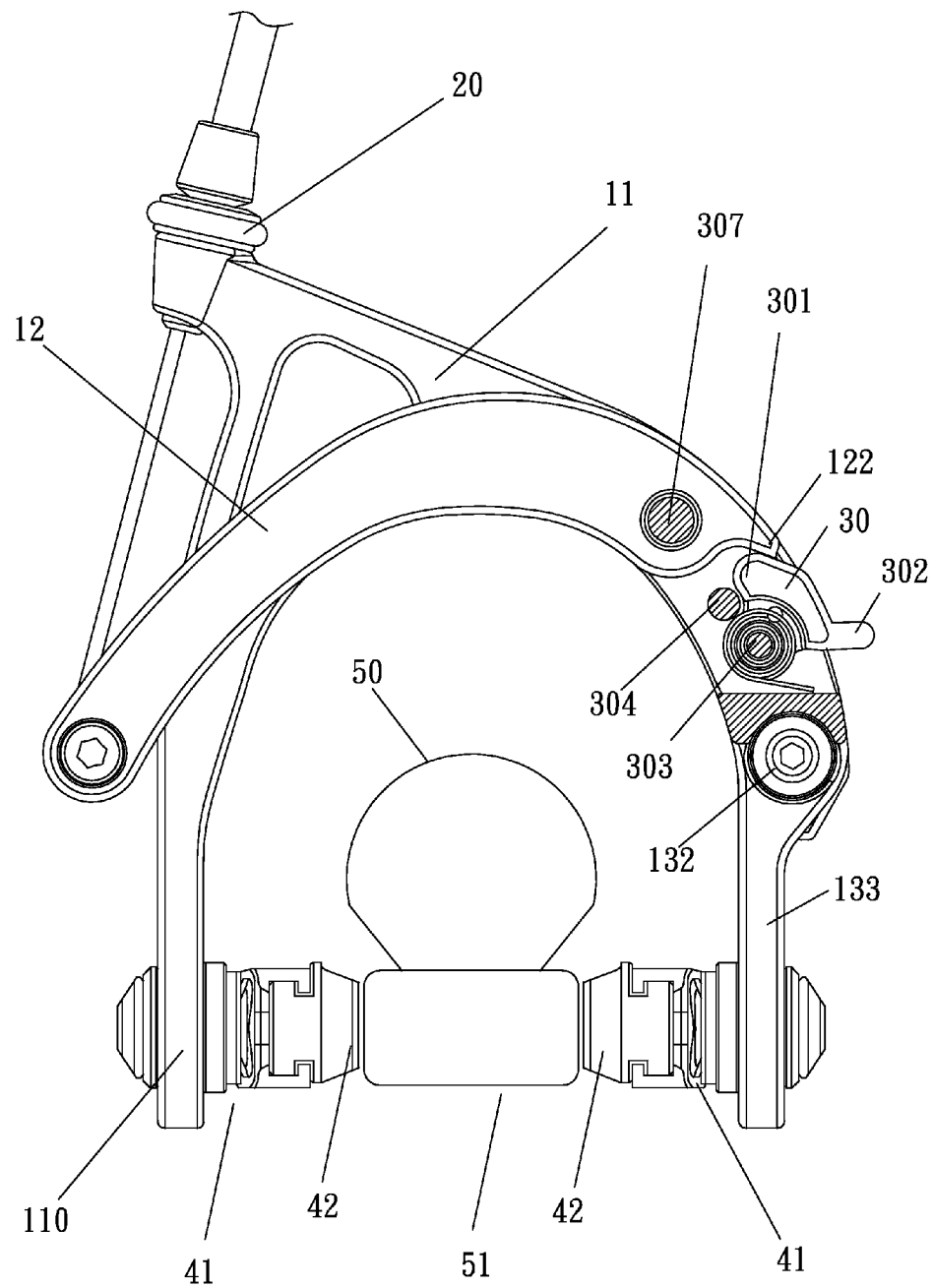
FIG. 3 is a front view in part section of FIG. 2 with a wheel rim disposed between two opposite brake pads in an inoperative position.

In an inoperative position as shown in FIG. 3, the sharp end 122 always exerts a downward force on the urging portion 301 because the section of the brake cable 21 between the cable adjuster 20 and the other end of the pivotal second arm 12 is held tight.

Figure 4:
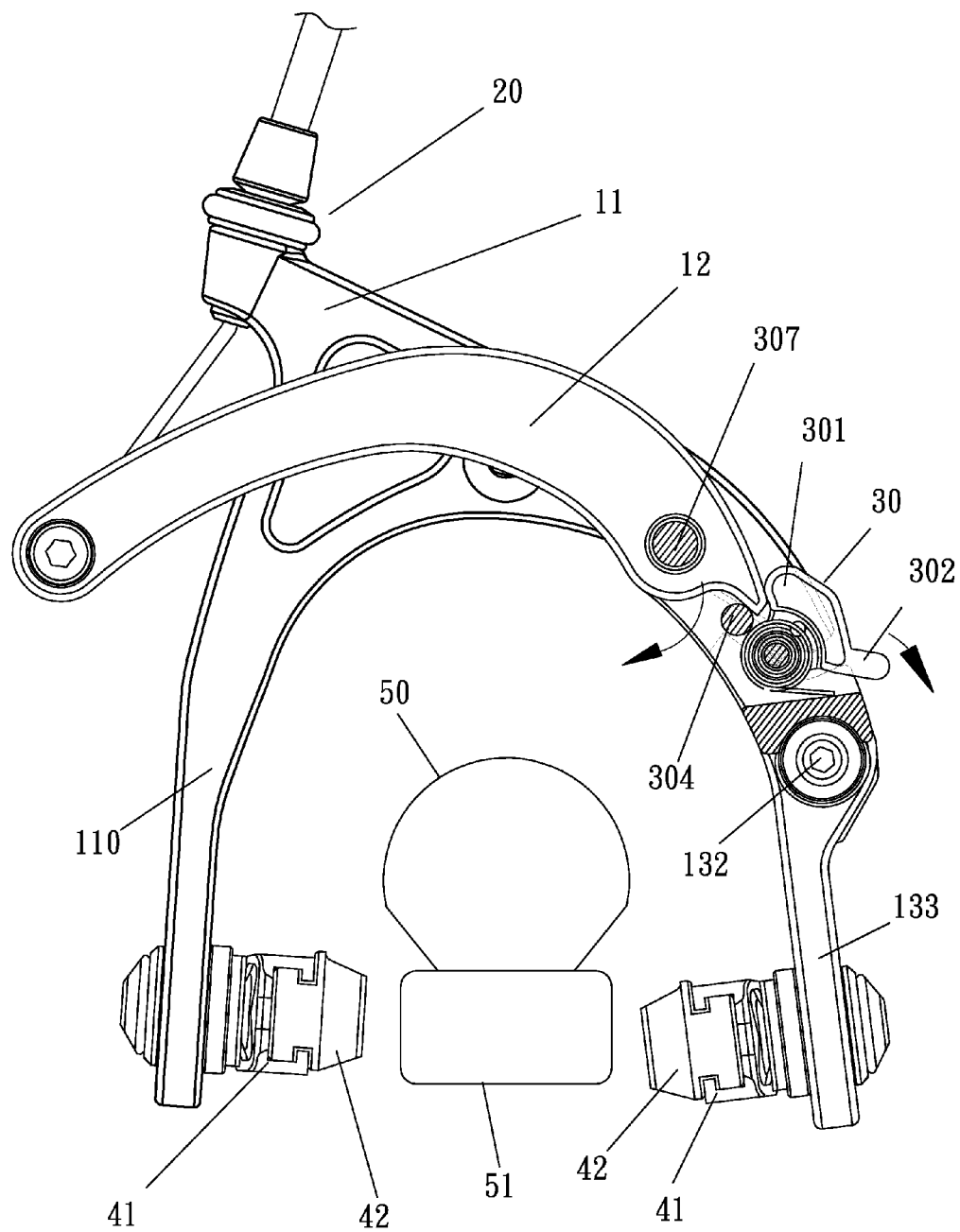
FIG. 4 is a view similar to FIG. 3 showing the cam lever mechanism activated to loosen brake cable so that a distance between two brake pads can be increased for facilitating a subsequent wheel replacement.

For replacing a worn or broken wheel 50 as shown in FIG. 4, a driver may clockwise depress the projection 302 (as indicated by one arrow) until the sharp end 122 clockwise pivots to be clamped by and between the urging portion 301 and the fastener 304 (as indicated by the other arrow). Hence, the brake cable 21 is loosened. Thereafter, the driver may manually move the brake pad mounts 41 apart to open the brake device 10 until a desired distance between the brake pads 42 for a subsequent wheel replacement is obtained. This brake cable loosening operation can be done by a driver without using tools.

While the invention has been described in terms of preferred embodiments, those skilled in the art will recognize that the invention can be practiced with modifications within the spirit and scope of the appended claims.

What is claimed is:

1. A brake apparatus for a bicycle, the brake apparatus comprising:
   a finger member;
   a first arm comprising a cable adjuster with a brake cable securely passing through, a first brake pad attachment member, a first brake pad mount fastened at the first brake pad attachment member, and a first brake pad fastened at the first brake pad mount;
   first means for pivotably securing the first arm and one end of the finger member to a frame of the bicycle;
   a pivot member pivotably secured to the other end of the finger member and comprising a second brake pad attachment member, a second brake pad mount fastened at the second brake pad attachment member, a second brake pad fastened at the second brake pad mount, and a bifurcation distal the second brake pad attachment member;
   a second arm having an extension proximate to one end and the other end secured to one end of the brake cable;
   second means for pivotably securing the bifurcation and the one end of the second arm together;
   a spring depressible cam lever pivotably mounted in the bifurcation, the cam lever being pressed by the extension of the second arm and comprising an actuation projection; and
   a fastener disposed in the bifurcation and being adjacent to the cam lever,
   whereby clockwise depressing the actuation projection to clockwise pivot the extension of the second arm until the extension of the second arm is clamped by and between the cam lever and the fastener will loosen the brake cable and increase a distance between the first brake pad and the second brake pad.

* * * * *